Patented Mar. 12, 1935

1,993,761

UNITED STATES PATENT OFFICE 1,993,761

COMPOSITION FOR WATER PURIFICATION

Benjamin F. Tippins, Yulee, Fla., assignor, by mesne assignments, to Activated Alum Corporation, New York, N. Y., a corporation of New York No Drawing. Application September 12, 1932, Serial No. 632,797

7 Claims. (Cl. 210—23)

The invention relates to the purification of water systems including sewage and consists in the combination in appropriate proportions below indicated of activated carbon and aluminum sulfate, making a composition that can be economically produced and that can be fed to the water supply with facility and with a particularly efficient action in producing the floc or precipitate, the latter being the effect of the intimate relation of the carbon and coagulant at the moment of their contact with the liquid.

According to this invention finely powdered carbon, such as made by carbonizing the waste from the soda process of paper pulp manufacture, is thoroughly mixed with the coagulant. An activated carbon of the character of that known to the trade as Nuchar is well suited to the purpose and aluminum sulfate of about 16 mesh or finer, and a formula, $Al_2(SO_4)_3.18H_2O$, is suitable as the coagulant although ferrous sulfate ($FeSO_4.7H_2O$) or equivalent may also be used. These two principal ingredients, with or without others, are mixed together in the dry state, the carbon being finely divided and the coagulant being suitable if in granular form. The proportions may vary from 2% to 4% of the carbon for ordinary water purification to as much as 20% for cases of sewage treatment.

The resulting composition has the advantage that by its use the activated carbon and the coagulant become introduced simultaneously into the water, the carbon being therefore present at the inception of the flocculation in an active state. This condition gives a quick and full formation of floc which is dense and sticky and easily retained, as distinguished from a feathery condition likely to be picked up by the current. Less of the coagulant is required to produce the same purification effect and less free residual coagulant remains in the purified water. The composition moreover is substantially dustless and easily handled and inasmuch as the proportion of carbon is predetermined and fixed at the time of mixing, it is always adequate. Any suitable dry feeding machine may be used.

Thus according to this invention purification is accomplished by precipitating the pollution or undesired foreign matter in the water by initiating coagulation therein in the immediate presence of the activated carbon freshly wetted with coagulant solution.

Having described the invention the following is claimed:

1. A composition for the purification of watery materials, consisting essentially of a mixture of dry activated carbon and a dry coagulant.

2. A composition for the purification of watery materials, consisting essentially of a mixture of dry activated carbon and dry aluminum sulfate.

3. A dry granular composition for the purification of watery materials, comprising activated carbon and a coagulant, in proportions ranging from 2 to 20% of carbon taken with respect to the amount of coagulant, said carbon and coagulant being present in the composition in amount sufficient to determine the action of the composition on said materials.

4. A dry granular composition for the purification of watery materials, comprising aluminum sulfate and dry activated carbon in the proportion of 2 to 20%, the remainder being coagulant, said carbon and coagulant being present in the composition in amount sufficient to determine the action of the composition on said materials.

5. A composition for use in the purification of watery liquids comprising a mixture of dry activated carbon in the proportion of between about 2% and 4%, and dry sulphate of alumina between about 98% and 96%, said carbon and sulphate of alumina being present in the composition in amount sufficient to determine the action of the composition on the liquid treated.

6. A composition for the purification of watery materials consisting essentially of a dry mixture of activated carbon and ferrous sulfate.

7. The method of purifying liquids which consists in feeding thereto a mixture consisting essentially of dry activated carbon and a dry coagulant.

BENJAMIN F. TIPPINS.